United States Patent
Deicke et al.

(10) Patent No.: US 10,316,826 B2
(45) Date of Patent: Jun. 11, 2019

(54) DRIVE SYSTEM OF A WIND TURBINE

(71) Applicant: SIEMENS AKTIENGESELLSCHAFT, München (DE)

(72) Inventors: Matthias Deicke, Uetze/Schwüblingsen (DE); Stefan Tenbrock, Bocholt (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 175 days.

(21) Appl. No.: 15/304,392

(22) PCT Filed: Apr. 15, 2015

(86) PCT No.: PCT/EP2015/058131
§ 371 (c)(1),
(2) Date: Oct. 14, 2016

(87) PCT Pub. No.: WO2015/158753
PCT Pub. Date: Oct. 22, 2015

(65) Prior Publication Data
US 2017/0030335 A1    Feb. 2, 2017

(30) Foreign Application Priority Data

Apr. 15, 2014 (DE) .......................... 10 2014 207 230
Jul. 18, 2014 (EP) ..................................... 14177650

(51) Int. Cl.
*F16H 1/46* (2006.01)
*F03D 80/70* (2016.01)
(Continued)

(52) U.S. Cl.
CPC ............... *F03D 15/00* (2016.05); *F03D 9/25* (2016.05); *F03D 15/10* (2016.05); *F03D 80/70* (2016.05);
(Continued)

(58) Field of Classification Search
None
See application file for complete search history.

(56) References Cited

U.S. PATENT DOCUMENTS 8,075,442 B2 * 12/2011 Ciszak .................... F03D 15/00
475/331
2010/0160104 A1 * 6/2010 Dinter ................. F16H 57/0427
475/159

(Continued)

FOREIGN PATENT DOCUMENTS

AT        507 397 A1    4/2010
CN    202 074 011 U    12/2011
(Continued)

OTHER PUBLICATIONS

International Search Report issued by the European Patent Office in International Application PCT/EP2015/058131.

*Primary Examiner* — Justin Holmes
(74) *Attorney, Agent, or Firm* — Henry M. Feiereisen LLC

(57) ABSTRACT

A drive system of a wind turbine includes a transmission gear configured to be connected to a wind rotor shaft, the transmission gear having a first planetary gear set and a second planetary gear set, and a generator downstream of the transmission gear. The transmission gear and the generator are mounted in sliding bearings.

12 Claims, 4 Drawing Sheets

(51) Int. Cl.
  *F03D 15/00* (2016.01)
  *F03D 15/10* (2016.01)
  *H02K 7/116* (2006.01)
  *H02K 7/18* (2006.01)
  *F03D 9/25* (2016.01)
  *F16H 57/08* (2006.01)
  *H02K 5/20* (2006.01)
  *F16H 57/04* (2010.01)

(52) U.S. Cl.
  CPC ............. *F16H 1/46* (2013.01); *H02K 7/116* (2013.01); *H02K 7/1838* (2013.01); *F05B 2240/54* (2013.01); *F05B 2260/40311* (2013.01); *F05B 2260/98* (2013.01); *F16H 57/0471* (2013.01); *F16H 57/082* (2013.01); *F16H 2057/085* (2013.01); *H02K 5/20* (2013.01); *Y02E 10/725* (2013.01)

(56) References Cited

U.S. PATENT DOCUMENTS

| | | | | |
|---|---|---|---|---|
| 2011/0068645 | A1* | 3/2011 | Potter | B02C 15/006 |
| | | | | 310/54 |
| 2011/0140448 | A1* | 6/2011 | Takeuchi | F16H 57/082 |
| | | | | 290/55 |
| 2011/0243740 | A1* | 10/2011 | Siegfriedsen | F16H 1/48 |
| | | | | 416/170 R |
| 2012/0157256 | A1* | 6/2012 | Takeuchi | F16H 57/0456 |
| | | | | 475/159 |
| 2013/0053210 | A1* | 2/2013 | Kari | F16C 33/203 |
| | | | | 475/331 |
| 2013/0088016 | A1 | 4/2013 | Dinter et al. | |
| 2013/0165288 | A1 | 6/2013 | Dinter et al. | |
| 2013/0172141 | A1 | 7/2013 | Dinter et al. | |
| 2013/0172144 | A1 | 7/2013 | Suzuki et al. | |
| 2013/0217535 | A1 | 8/2013 | Suzuki et al. | |
| 2014/0302957 | A1 | 10/2014 | Böing et al. | |
| 2014/0361807 | A1 | 12/2014 | Deicke | |

FOREIGN PATENT DOCUMENTS

| | | | |
|---|---|---|---|
| DE | 10 2005 056 389 A1 | 1/2006 | |
| DE | 20 2011 107 611 U1 | 1/2013 | |
| EP | 2 302 257 A2 | 3/2011 | |
| EP | 2 472 132 A1 | 4/2012 | |
| EP | 2 508 753 A1 | 10/2012 | |
| EP | 2 508 754 A1 | 10/2012 | |
| EP | 2 508 777 A1 | 10/2012 | |
| EP | 2 541 096 A1 | 1/2013 | |
| EP | 2 541 058 A1 | 2/2013 | |
| EP | 2 573 386 A1 | 3/2013 | |
| WO | WO-2011024898 A1 * | 3/2011 | ............ F16H 57/082 |
| WO | WO 2012/159108 A2 | 11/2012 | |
| WO | WO 2013/106879 A1 | 7/2013 | |

* cited by examiner

DRIVE SYSTEM OF A WIND TURBINE

CROSS-REFERENCES TO RELATED APPLICATIONS

This application is the U.S. National Stage of International Application No. PCT/EP2015/058131, filed Apr. 15, 2015, which designated the United States and has been published as International Publication No. WO 2015/158753 which claims the priority of European Patent Application, Serial No. 14177650.0, filed Jul. 18, 2014 and German Patent Application, Serial No. 10 2014 207 230.1, filed Apr. 15, 2014 pursuant to 35 U.S.C. 119(a)-(d).

BACKGROUND OF THE INVENTION

The present invention relates to a drive system of a wind turbine.

Drive trains for wind turbines are known and are used to convert the rotational energy of a wind rotor set in motion by the wind, into electrical energy by means of a generator coupled to the wind rotor. Herein, the wind rotor typically reaches rotary speeds in the region of approximately 10 to 20 $min^{-1}$.

A large proportion of the existing wind turbines is equipped with rapidly rotating generators having a rotary speed of 1000 to 2000 $min^{-1}$. In order to convert the relatively slow rotary speed of the wind rotor to the generator rotary speed, a three or more-stage transmission is connected therebetween which, in combination with the generator, is known in general as the drivetrain. The two drivetrain components are configured substantially independently from one another and are connected to one another via conventional couplings. This means that the drivetrain which in this case is designated a "non-integrated drivetrain", comprises a gearing transmission with three or more gearing stages, a coupling and a generator, which are arranged in this order in the nacelle of the wind turbine behind the rotor shaft.

It is disadvantageous herein that the drivetrain requires a relatively large amount of space and due to the large number of components, has a complex structure.

Apart from this conventional gearbox solution, generators are also used which are coupled without a gearbox to the wind rotor. In this "direct drive" construction, the slowly running generator is driven directly by the wind rotor. A disadvantage herein is that due to the high torque that is conducted directly into the generator from the wind rotor, the generator and, in particular, the rotor of the generator have a comparatively large diameter. This is associated with relatively large dimensions and a large weight of the drivetrain.

A third concept provides for connecting a medium-speed generator and a transmission firmly to one another in a drivetrain component, in order to obtain a compact transmission-generator unit for wind turbines. A drivetrain of this type is described, for example, in EP 2 508 753 A1 (Siemens AG; Winergy AG) 10.10.2012. The drivetrain known from this published application for a wind turbine has a transmission with a transmission housing which is connected via a slowly rotating input shaft to a wind rotor. Furthermore, a generator is provided which has a generator housing which is firmly connected to the transmission housing. A rotor of the generator is driven via a sun gear shaft of the transmission. By means of the rotor rotating relative to a fixed generator stator, the rotational energy of the wind rotor is converted in a per se known manner into electrical energy by means of electrical induction. In modern wind turbines of this design, the gearing transmission is configured, for example, as a two-stage planetary gear set and the generator is configured, for example, as a permanent magnet generator.

The direct connection of the transmission to the generator leads to a substantial shortening of the drivetrain as compared with the "non-integrated drivetrain". The coupling between the transmission and the generator is dispensed with in the medium-speed drivetrain and is replaced by similarly-acting connecting elements. Medium-speed systems require a smaller quantity of permanent magnets, as compared with permanent magnet direct-drives. The smaller dimensions as compared with conventional non-integrated drives and the lower weight of the medium-speed drives permit new nacelle configurations.

In all drivetrain configurations, roller bearings are one of the substantial causes of failures in a wind turbine.

For uses with a non-integral drivetrain, in the past, solutions have been developed for replacing the roller bearings with slide bearings.

For direct drives, according to the present state of the art, the use of slide bearings does not come into consideration or only to a very limited extent. A substantial reason for this is that in direct drives, the bearing diameter is so large that slide bearings exist or that slide bearings segmented in the peripheral direction must be used.

In medium-speed drives, particularly with a modular construction in which the generator is connected to the transmission in the form of a separate, enclosed component with the transmission, it is known to use slide bearings for the planet gears instead of conventional roller bearings. However, so far, the generators continue to be equipped with roller bearings so that significant expenditure must be made for the maintenance and serviceability of these roller bearings: to date, for modular construction medium-speed drivetrains, a separation point between the generator and the transmission has been provided. This separation point serves for the separability of both components in order to be able to separate the generator from the transmission in the event of a generator-side roller bearing damage.

SUMMARY OF THE INVENTION

It is an object of the present invention to provide a drivetrain of a wind turbine wherein the transmission and the generator are directly connected to one another, which is more reliable and has a lower failure probability.

According to one aspect of the invention, the object is solved by a drive system for a wind turbine, including a gearing transmission which is connectable to a wind rotor shaft, and a generator connected downstream of the transmission, wherein both the transmission and the generator are mounted in slide bearings.

The gearing transmission can include one or a plurality of planetary gear set stages. The generator is arranged, seen in the direction of the force flow, behind the transmission, i.e. on the side of the transmission facing away from the wind rotor. Both the transmission and the generator are mounted in slide bearings. Herein, "a transmission mounted in slide bearings" can mean that the planet gear bearings and/or the planet carrier bearings in the transmission are configured as slide bearings. If the planet carrier bearings are configured as slide bearings, these are preferably slide bearings segmented in the peripheral direction; the bearing is herein divided into segments partitioned over the periphery of the mounted planet carrier. Herein "a generator mounted in slide bearings" means that the rotation of the rotor of the generator takes place in at least one slide bearing; preferably, all the bearings of the rotor of the generator are configured as slide bearings.

The object is solved by the use of slide bearings in the generator and in the transmission for medium-speed systems. The invention therefore relates to systems wherein the generator at least partially comprises a separate mounting (modular or half-integrated systems). In modular systems, the generator is connected to the transmission in the form of a separately mounted system component. In completely integrated systems, the generator has no separate mounting, but is mounted entirely via the transmission. In the case of partly-integrated or half-integrated systems, the generator is mounted both by means of the transmission as well as by means of one or more dedicated bearings.

By means of the invention, that is, the combination of a slide bearing-mounted generator with a slide bearing-mounted transmission, the interface between the transmission and the generator can be significantly simplified, since a servicing facility no longer has to be made available in order to exchange a fault-prone roller bearing of the generator.

The failure of such a roller bearing would, after all, require the disassembly of the rotor blades and lifting out of the shaft and of the entire defective bearing from the nacelle of the wind turbine and the subsequent replacement of the defective parts. Since, however, these parts weigh in the region of 100 tons, a repair of this type, particularly in offshore systems involves extremely great effort. For example, floating crane platforms with corresponding carrying capacity must be provided, entailing very high costs. A significant lessening of the fault susceptibility as provided by the present invention therefore constitutes a significant advantage.

The invention has the following advantages or yields the following synergistic effects:

In compact drives, a bearing is to be arranged between the generator and the transmission. This bearing absorbs both the forces of the transmission output shaft and also portions of the rotor bearing forces.

The invention is based on the fact that hydrodynamically/hydrostatically operated slide bearings function wear-free. In that a slide bearing is used as the bearing arranged between the generator and the transmission, the probability of a bearing defect is significantly reduced. Thus, the servicing frequency and the costs associated with a service visit can be significantly reduced. The interface between the transmission and the generator can be significantly simplified, since a servicing facility no longer has to be made available.

It is only in the combination of the features medium-speed, modular or partially integrated and slide bearings for both the main components transmission and generator that the technical advantage of the present invention has its full effect.

In particular, it is advantageous in drivetrains, in particular, modular-constructed medium-speed drivetrains, to replace the roller bearing which is provided at the separation point between the generator and the transmission with a slide bearing. This separation point between the transmission and the generator can thereby be significantly simplified, since a servicing facility no longer has to be made available.

EP 2 508 753 A1 (Siemens; Winergy) 2012 Oct. 10, EP 2 508 754 A1 (Siemens) 2012 Oct. 10, EP 2 508 777 A1 (Siemens) 2012 Oct. 10, EP 2 541 096 A1 (Siemens) 2013 Jan. 02, EP 2 541 058 A1 (Siemens) 2013 Jan. 02 and EP 2 573 386 A1 (Siemens; Winergy) 2013 Mar. 27, describe drive systems. These systems are particularly suitable therefor that both the transmission and the generator are mounted in slide bearings.

In the following description, several examples of a drive system are described. These systems are particularly suitable therefor that both the transmission and the generator are mounted in slide bearings.

A drivetrain for a wind energy system having a transmission which has a transmission housing and is connected or connectable via an input shaft to a wind rotor, and a generator which has a generator housing which is firmly connected to the transmission housing and in which at least one stator and at least one rotor are provided, wherein the rotor is coupled to an output shaft of the transmission mounted by means of bearings on the transmission housing, said output shaft running faster during operation than the input shaft, characterized in that the generator has a generator shaft arranged coaxially with the output shaft of the transmission and mounted on the generator housing by means of bearings, said generator shaft being connected via connecting flanges to the output shaft of the transmission, wherein an electrical insulation is provided between the connecting flanges, in that a labyrinth seal or a gap seal is provided between the transmission housing and the generator housing and in that, in sequence, the bearings, the labyrinth seal or gap seal and the connecting flange are held on the output shaft and following thereafter, the connecting flange, the rotor and the bearing are held on the generator shaft.

A drive system for a wind turbine having
a transmission unit comprising at least one planetary gear stage which has a ring gear, a plurality of planet gears, a planet carrier and a sun gear,
a first shaft associated with the transmission unit, said shaft comprising a coupling flange which is elastically connectable to a wind rotor shaft and being mounted by means of the planet carrier, and
a transmission housing surrounding the transmission unit and a generator unit connected to a second shaft of the transmission unit, said housing having a cardanic circumferentially symmetrical or partially symmetrical mounting for connection to a supporting structural element of the wind turbine, the cardanic mounting being formed by a ring-shaped mount radially surrounding the circumference of the transmission housing, said ring-shaped mount having a plurality of bores arranged substantially equidistantly in the circumferential direction, into which elastic bolts are inserted, said bolts being connectable to a corresponding torque mount on the supporting structural element of the wind turbine, or that the cardanic mounting is formed by two ring segment mounts radially surrounding part of the circumference of the transmission housing, each of which has, in the circumferential direction, a plurality of bores arranged substantially equidistantly, into which elastic bolts are inserted, said bolts being connectable to corresponding torque mounts on the supporting structural element of the wind turbine.

A drive system for a wind turbine having
a transmission unit comprising at least one planetary gear stage which has a ring gear, a plurality of planet gears, a planet carrier and a sun gear, a first shaft associated with the transmission unit, said shaft comprising a coupling flange which is connectable to a wind rotor shaft and being mounted by means of the planet carrier, a transmission housing surrounding the transmission unit and a generator unit connected to a second shaft of the transmission unit, a rotor of the generator unit, said rotor being connected non-rotatably to a rotor hollow shaft, a generator-side end portion of the second shaft of the transmission unit, said end portion being concentrically surrounded by the rotor hollow shaft and connected thereto by means of a coupling or clamping connection arranged within the rotor hollow shaft, a transmission housing connecting piece arranged between the transmission unit and the generator unit, said connecting piece concentrically surrounding a transmission-side end portion of the rotor hollow shaft and forming a bearing seating for a bearing arrangement associated with the rotor hollow shaft, by means of which bearing arrangement the second shaft of the transmission unit is also mounted.

A drive system for a wind turbine having a transmission unit comprising at least one planetary gear stage which has a ring gear, a plurality of planet gears, a planet carrier and a sun gear, a first shaft associated with the transmission unit, said shaft comprising a coupling flange which is connectable to a wind rotor shaft, and being mounted by means of the planet carrier, a transmission housing surrounding the transmission unit and a generator unit connected to a second shaft of the transmission unit, a rotor of the generator unit, said rotor being connected non-rotatably to a rotor hollow shaft, the rotor hollow shaft being axially spaced from the second shaft of the transmission unit, a releasable flange connection arranged between the rotor hollow shaft and the second shaft of the transmission unit, the transmission-side end of said flange connection being connected to a transmission hollow shaft, a generator-side end portion of the second shaft of the transmission unit, said end portion being surrounded concentrically by the rotor hollow shaft and connected thereto by means of a coupling or clamping connection arranged within the transmission hollow shaft, a transmission housing connecting piece arranged between the transmission unit and the generator unit, said connecting piece forming a bearing seating for a bearing arrangement associated with the second shaft of the transmission unit, by means of which bearing arrangement the rotor hollow shaft is also mounted, the releasable flange connection being electrically isolating, and the transmission housing connecting piece concentrically surrounds a transmission-side end portion of the transmission hollow shaft.

A drive system for a wind turbine having a transmission unit comprising at least one planetary gear stage which has a ring gear, a plurality of planet gears, a planet carrier and a sun gear, a first shaft associated with the transmission unit, said shaft comprising a coupling flange which is connectable to a wind rotor shaft, and being mounted by means of the planet carrier, a transmission housing surrounding the transmission unit and a generator unit connected to a second shaft of the transmission unit, a rotor of the generator unit, said rotor being connected non-rotatably to a rotor hollow shaft, a transmission housing connecting piece with a hollow cylindrical protrusion arranged between the transmission unit and the generator unit, said connecting piece concentrically surrounding a generator-side end portion of the second shaft of the transmission unit and forming a bearing seating for a bearing arrangement arranged radially between the second shaft and the hollow cylindrical protrusion, at least one exterior bearing element of the bearing arrangement which is connected to the hollow cylindrical protrusion, both the second shaft of the transmission unit and also the rotor hollow shaft being mounted by means of the bearing arrangement, the drive system comprising a coupling or clamping connection arranged radially between the second shaft of the transmission unit and the rotor hollow shaft, and the rotor and the rotor hollow shaft surround the hollow cylindrical protrusion concentrically.

A drive system for a wind turbine having a transmission unit comprising at least one planetary gear stage which has a ring gear, a plurality of planet gears, a planet carrier and a sun gear, a first shaft associated with the transmission unit, said shaft comprising a coupling flange which is connectable to a wind rotor shaft, and being mounted by means of the planet carrier, a generator unit connected to the transmission unit, a second shaft configured as a hollow shaft associated with the transmission unit, said second shaft concentrically surrounding with its transmission-side end portion, a generator-side end portion of a sun gear shaft and being connected non-rotatably thereto, a rotor of the generator unit, said rotor being connected non-rotatably to a rotor hollow shaft, a stub shaft which is connected non-rotatably to the rotor hollow shaft, the transmission-side end portion of said stub shaft being concentrically surrounded by the second shaft of the transmission unit and there being connected non-rotatably thereto, a transmission housing connecting piece which is arranged between the transmission unit and the generator unit and concentrically surrounds the second shaft of the transmission unit and forms a bearing seating for a bearing arrangement associated with the second shaft, and by means of which the sun gear shaft is also mounted, two housing covers each arranged on a generator end face, said housing covers forming bearing seatings for a first and second bearing of the rotor hollow shaft.

Advantageous embodiments and developments of the invention are disclosed in the dependent claims.

According to a preferred embodiment of the invention, what is concerned is a modular system wherein the generator has a separate mounting which is independent of the transmission mounting. In this way, the advantage is gained that the transmission and the generator can be repaired and disassembled independently of one another.

According to a preferred embodiment of the invention, what is concerned is an integrated system wherein a transmission and a generator are integrated: in integrated systems, the generator no longer has a separate mounting, but rather is at least partially mounted via the transmission. Wind turbines with an integrated drivetrain, i.e. wherein the transmission and the generator are integrated, offer advantages as compared with a non-integrated drivetrain, for example, a smaller space requirement.

According to a preferred embodiment of the invention, the gearing transmission is a two-stage transmission, in particular a planetary gear set consisting of two planetary gear stages. Wind turbines with a two-stage transmission are generally designated medium-speed systems, while wind turbines with three or more transmission stages are designated high-speed systems. Medium-speed systems preferably function with a two-stage planetary gear set and dispense with a rapidly-rotating spur gear stage.

According to a preferred embodiment of the invention, the drive system comprises a parting line in the housing for axial separation of the transmission from the generator. This separation point provides for the axial separability of both components in order to separate the generator axially from the transmission in the event of damage in the drive system.

According to a preferred embodiment of the invention, the slide bearings can consist of metallic and/or non-metallic bearing materials. The structure of the slide bearings can be single-layered and multi-layered. In this way, the advantage can be achieved that the properties of the slide bearings can be adapted within a wide range to the respective boundary conditions.

According to a preferred embodiment of the invention, the bearing material is coated with a further wear-protection layer. In this way, the advantage is achieved that the properties of the slide bearings can be adapted within a wide range to the respective boundary conditions.

According to a preferred embodiment of the invention, the slide bearings comprise a double-direction axial slide bearing. In this way, the advantage is gained that large axial forces can be transmitted in both axial directions.

According to a preferred embodiment of the invention, the slide bearings comprise a slide bearing with and without segmentation. In this way, the advantage is gained that slide bearings can be provided for differently sized bearing diameters.

According to a preferred embodiment of the invention, the slide bearings comprise a slide bearing with adjustable axial and/or radial play. In this way, the advantage is achieved that the running properties of the slide bearings can be adapted within a wide range to the respective boundary conditions.

According to a preferred embodiment of the invention, the planet carrier mounting is also configured as a slide bearing mounting. In this way, the advantage is achieved that the advantages of slide bearings are also usable for the planet carrier mounting. It is advantageous if the planet carrier bearings which have a relatively large diameter are slide bearings with segmentation.

According to a preferred embodiment of the invention, the lubrication of the slide bearings takes place by means of low pressure, high pressure or gravitation.

According to a preferred embodiment of the invention, the slide bearings are geometrically modified so that they are adapted to the installation and loading situation.

BRIEF DESCRIPTION OF THE DRAWING

The invention will now be described by reference to several exemplary embodiments with the aid of the drawings. In the drawings, shown schematically and not to scale.

DETAILED DESCRIPTION OF PREFERRED EMBODIMENTS

Figure 1:
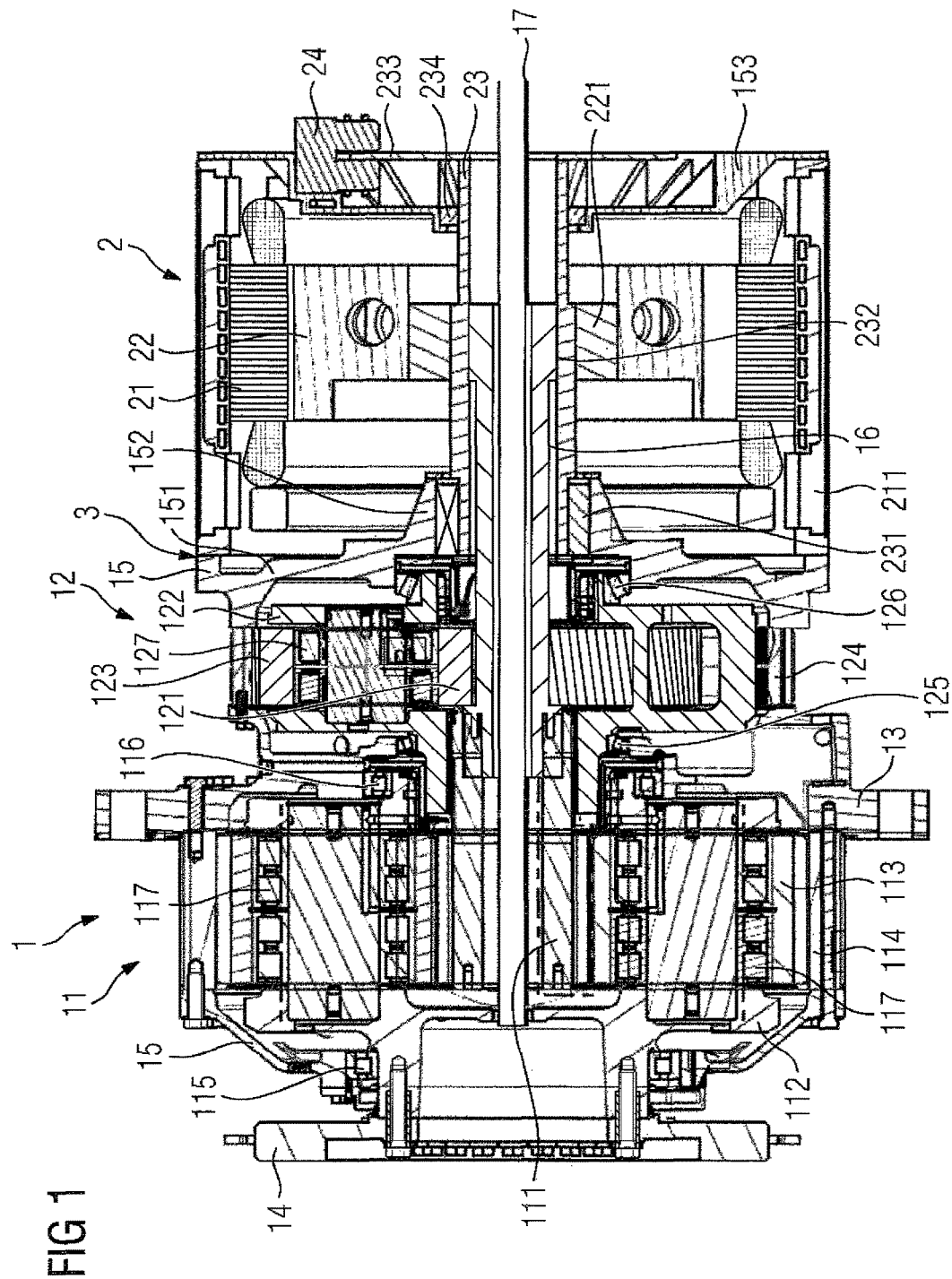
FIG. 1 is a drivetrain according to the invention with a rotor shaft of the generator unit which is mounted at both ends thereof.

FIG. 1 shows a drive system for a wind turbine which has a transmission unit 1 with a first 11 and a second planetary gear stage 12 in a coaxial construction. Herein, each planetary gear stage 11, 12 comprises a ring gear 114, 124, a plurality of planet gears 113, 123, a planet carrier 112, 122 and a sun gear 111, 121. "Coaxial construction" means that the rotation axes of the sun gears 111, 121 of both planetary gear stages 11, 12 coincide.

The transmission unit 1 is connected via an output shaft 16 of the transmission unit 1 to a generator unit 2 and is arranged together therewith in a transmission housing 15. Between the transmission unit 1 and the generator unit 2, the transmission housing 15 has a parting line 3 along which the transmission unit 1 and the generator unit 2 can be parted. An input shaft formed on the planet carrier 112 of the first planetary gear stage 11 is associated with the transmission unit 1, said input shaft having a coupling flange 14 which is connectable to a wind rotor shaft, and being mounted by means of the planet carrier 112 of the first planetary gear stage 11. Two bearings 115 and 116 which represent a first and second main bearing of the transmission unit 1 and are arranged between the planet carrier cheeks and the transmission housing 15 are associated with the planet carrier 112 of the first planetary gear stage 11. Similarly, the planet carrier 122 of the second planetary gear stage 12 is mounted by means of two bearings 125 and 126 arranged between the planet carrier cheeks and the transmission housing 15.

The transmission housing 15 comprises a full cardanic mounting 13 for connecting to a supporting structural element of the wind turbine. This supporting structural element is, for example, a frame or a nacelle of the wind turbine.

The generator unit 2 comprises a stator 21 and a rotor 22 which is connected non-rotatably to a rotor hollow shaft 23. The rotor hollow shaft 23 concentrically surrounds a generator-side end portion of the output shaft 16 and is connected thereto by means of a coupling or clamping connection 232 arranged within the rotor hollow shaft 23. A transmission housing connecting piece 152 is arranged between the transmission unit 1 and the generator unit 2. This housing connecting piece 152 concentrically surrounds a transmission-side end portion of the rotor hollow shaft 23 and forms a bearing seating for a bearing arrangement 231 associated with the rotor hollow shaft 23. Inter alia, axial forces of the output shaft 16 are absorbed in the bearing 231, where these arise.

Arranged within the output shaft 16 and the rotor hollow shaft 23 in the present exemplary embodiment is a pitch tube 17 which extends axially beyond the whole of the drive system. By means of the pitch tube 17, energy and signal lines can be fed from the generator-side end of the transmission housing 15 into the hub of the wind rotor, in particular, to supply pitch drives arranged in the hub for adjusting the pitch of wind rotor blades.

The rotor hollow shaft 23 can have, for example, an outer diameter which grows step-wise in the direction from the generator unit 2 toward the transmission unit 1. In order that, in this case, the rotor hollow shaft 23 can also be removed without disassembly of the rotor 22 of the generator unit 2, in the present exemplary embodiment, an internal clamping set 221 is provided between the rotor hollow shaft 23 and the rotor 22. The internal clamping set 221 herein has a larger outer diameter than the rotor hollow shaft 23.

Advantageously, an outer diameter of the sun gear 121 of the second planetary gear stage 12 is smaller than an inner diameter of the rotor hollow shaft 23. Thus the output shaft 16 and the rotor hollow shaft 23 can be inserted through an opening in a housing cover 153 of the transmission housing 15 arranged facing away from the transmission unit 1 and through an opening in the rotor 22 concentric with the rotor axis.

According to FIG. 1, the coupling or clamping connection 232 and the rotor 22 of the generator unit 2 are oriented coaxially with one another and have only one radial spacing from one another. Herein, approximately half of the output shaft 16 of the transmission unit 1 is surrounded by the rotor hollow shaft 23. The bearing arrangement 231 of the rotor hollow shaft 23 arranged on the housing connecting piece 152 is advantageously arranged approximately mid-way axially between the coupling or clamping connection 232 and the sun gear 121 of the second planetary gear stage 12.

The bearing arrangement 231 of the rotor hollow shaft 23 on the housing connecting piece 152 preferably comprises a slide bearing which is capable of absorbing radial and axial forces. Herein, the axial forces can be absorbed in both axial directions. Furthermore, the rotor hollow shaft 23 and the output shaft 16 of the transmission unit 1 are mounted, according to a particularly preferred embodiment, exclusively by means of the bearing arrangement 231 on the housing connecting piece 152. A rear rotor hollow shaft bearing 234, shown in FIG. 1, on an end face of the generator unit 2 facing away from the transmission unit 1 is therefore not necessarily required and can fundamentally be omitted. "Front" and "rear" relate to the wind direction, i.e. "front" is the windward side and "rear" is the leeward side.

Mounted non-rotatably fixed on the rotor hollow shaft 23 in the present exemplary embodiment on the end side of the generator unit 2 facing away from the transmission unit 1 is a brake disk 233 of a fixing brake. The brake disk 233 is thus readily accessible for maintenance purposes. A brake caliper 24 associated with the brake disk 233 is fastened on the housing cover 153 facing away from the transmission unit 1.

The bearings 115, 116, 125, 126 of the planet carriers 112, 122 are roller bearings. Alternatively, however, they can also be slide bearings. The bearings 117, 127 of the planet gears 113, 123 mounted in the planet carriers 112, 122 are slide bearings. The bearings 231, 234 of the rotor hollow shaft 23 are slide bearings.

Figure 2:
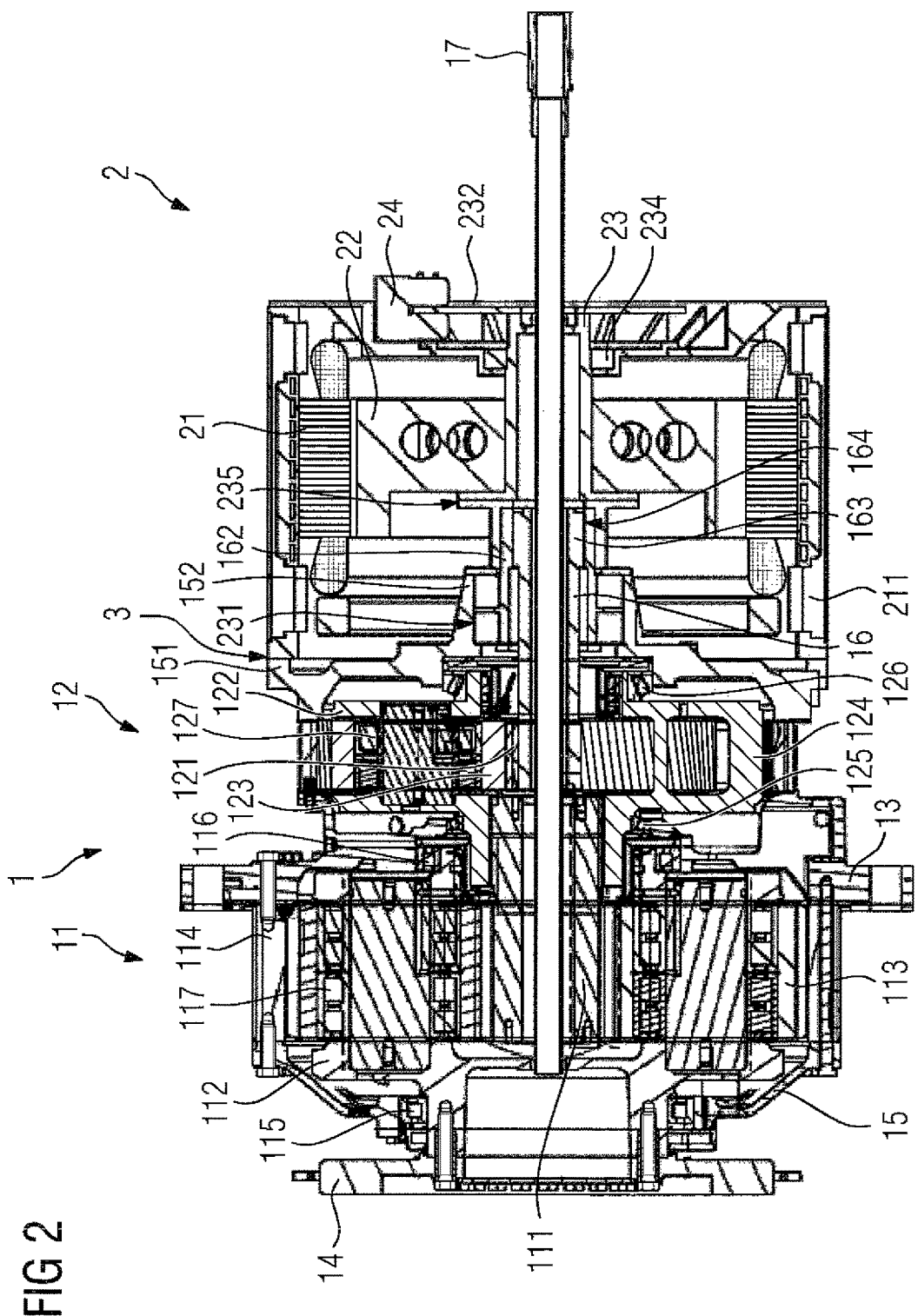
FIG. 2 is a drivetrain similar to that shown in FIG. 1, wherein the output shaft of the transmission unit is connected by means of a flange connection to the rotor shaft of the generator unit.

FIG. 2 shows a drive system for a wind turbine which is largely similar to the drive system shown in FIG. 1. However, the two drive systems differ in how the rotor shaft of the generator is mounted and in the rotary connection between the transmission output shaft 16 and the rotor hollow shaft 23.

In the drive system shown in FIG. 2, the generator unit 2 comprises a stator 21 and a rotor 22 which is connected non-rotatably to a rotor hollow shaft 23. The rotor hollow shaft 23 is arranged axially spaced from the output shaft 16 of the transmission unit 1 or adjoins said output shaft axially. Arranged between the rotor hollow shaft 23 and the output shaft 16 of the transmission unit 1 is an electrically isolating flange connection 235, the transmission-side end of which is connected to a hollow shaft 162. A generator-side end portion of the output shaft 16 of the transmission unit 1 is surrounded concentrically by the hollow shaft 162 and connected thereto by means of a coupling or clamping connection 163 arranged within the hollow shaft 162. A transmission housing connecting piece 152 is arranged between the transmission unit 1 and the generator unit 2. This housing connecting piece 152 concentrically surrounds a transmission-side end portion of the transmission hollow shaft 162 and forms a bearing seating for a bearing arrangement 231 associated with the output shaft 16 of the transmission unit 1. The output shaft 16 is also mounted by means of this bearing arrangement 231. Any axial forces occurring are absorbed in both directions in the bearing 231. Arranged within the output shaft 16 and the rotor hollow shaft 23 in the present exemplary embodiment is a pitch tube 17 which extends axially beyond the whole of the drive system.

As shown in the sectional representation in FIG. 2, a generator-side end of the flange connection 235 is formed onto the rotor hollow shaft 23. A plug-in toothing 164 for coupling of the output shaft 16 and the hollow shaft 162 is arranged on a generator-side end of the hollow shaft 162. Furthermore, the output shaft 16 of the transmission unit 1 is axially substantially half surrounded by the transmission hollow shaft 162. The bearing arrangement 231 arranged on the transmission housing connecting piece 152 is herein oriented axially approximately centrally on the output shaft 16 of the transmission unit 1 connected to the sun gear 121 of the second planetary gear stage 12.

Figure 3:
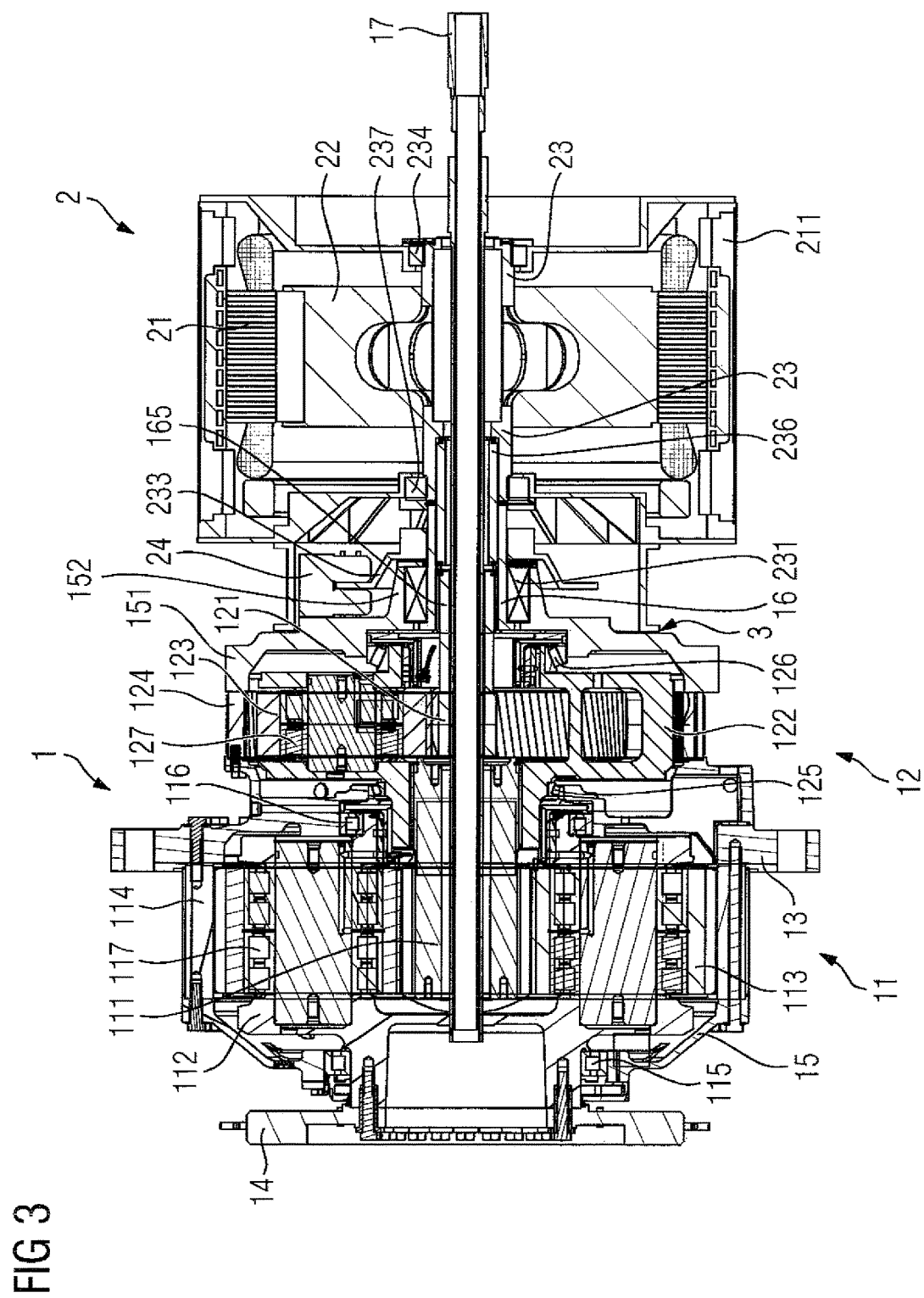
FIG. 3 is a drivetrain according to the invention with a bearing arrangement between the transmission unit and the generator unit.

FIG. 3 shows a drive system for a wind turbine which has a transmission unit 1 with a first 11 and a second planetary gear stage 12 in a coaxial construction. Herein, each planetary gear stage 11, 12 comprises a ring gear 114, 124, a plurality of planet gears 113, 123, a planet carrier 112, 122 and a sun gear 111, 121.

The transmission unit 1 is arranged connected via an output shaft 16, configured as a hollow shaft, of the transmission unit 1 to a generator unit 2 and is arranged in a transmission housing 15. Between the transmission unit 1 and the generator unit 2, the transmission housing 15 has a parting line 3 along which the transmission unit 1 and the generator unit 2 can be parted. The output shaft 16 concentrically surrounds, with the transmission-side end portion thereof, a generator-side end portion of a sun gear shaft 165 of the second planetary gear stage 12 and there is connected non-rotatably thereto. Herein, the output shaft 16 and the sun gear shaft 165 are connected to one another, for example, by means of a coupling or a clamping connection arranged within the output shaft 16. This can take place, in particular, by means of a short toothed coupling, spiral toothing, a polygonal connection, a keyed connection, an elastic bolt coupling or an internal clamping set.

The generator unit 2 comprises a stator 21 and a rotor 22 which is connected non-rotatably to a rotor hollow shaft 23. The rotor hollow shaft 23 is arranged axially spaced from the output shaft 16 of the transmission unit 1 or adjoins said output shaft axially. The rotor hollow shaft 23 is also connected non-rotatably to a stub shaft 236 which is concentrically surrounded at its transmission-side end section by the output shaft 16 of the transmission unit 1 and there is connected non-rotatably thereto. The output shaft 16 and the stub shaft 236 are herein connected to one another by means, for example, of a coupling or a clamping connection arranged within the output shaft 16. This can take place, in particular, by means of a short toothed coupling, spiral toothing, a polygonal connection, a keyed connection, an elastic bolt coupling or an internal clamping set.

In the variant of a drive system as illustrated in FIG. 3 with a short stub shaft, the rotor hollow shaft 23 is connected to the stub shaft 236 at a transmission-side end of the rotor hollow shaft 23 by means of a coupling or a clamping connection arranged within the rotor hollow shaft 23. This can take place, in this case also, by means of a short toothed coupling, spiral toothing, a polygonal connection, a keyed connection, an elastic bolt coupling or an internal clamping set.

In the drive system illustrated in FIG. 3, a transmission housing connecting piece 152 which concentrically surrounds the output shaft 16 and forms a bearing seating for a bearing arrangement 231 associated with the output shaft 16 is arranged between the transmission unit 1 and the generator unit 2. The sun gear shaft 165 is also mounted by means of this bearing arrangement 231. The transmission housing connecting piece 152 herein concentrically surrounds a generator-side end portion of the sun gear shaft 165. The bearing arrangement 231 of the output shaft 16 on the housing connecting piece 152 preferably comprises a slide bearing which can absorb forces in both axial directions and in the radial direction. Arranged within the output shaft 16 and the rotor hollow shaft 23 in the present exemplary embodiment is a pitch tube 17 which extends axially beyond the whole of the drive system.

Two housing covers each arranged on a generator end face provide bearing seatings for a first bearing 237 and second bearing 234 of the rotor hollow shaft 23. The bearing seating for the first bearing 237 of the rotor hollow shaft 23 is herein formed by a housing cover facing toward the transmission unit 1 at a first generator end side, whereas the bearing seating for the second bearing 234 of the rotor hollow shaft 23 is formed by a housing cover facing away from the transmission unit 1 at the second generator end side. The bearings 234 and 237 are preferably configured as slide bearings.

An input shaft formed on the planet carrier 112 of the first planetary gear stage 11 is associated with the transmission unit 1, said input shaft having a coupling flange 14 which is connectable to a rotor shaft and is mounted by means of the planet carrier 112 of the first planetary gear stage 11. Two bearings 115 and 116 which represent a first and second main bearing of the transmission unit 1 and are arranged between the planet carrier cheeks and the transmission housing 15 are associated with the planet carrier 112 of the first planetary gear stage 11. Similarly, the planet carrier 122 of the second planetary gear stage 12 is mounted by means of two bearings 125 and 126 arranged between the planet carrier cheeks and the transmission housing 15.

In the present exemplary embodiment, the housing connecting piece 152 concentrically surrounding the bearing arrangement 231 of the output shaft 16 is formed onto the housing intermediate flange 151 arranged between the transmission unit 1 and the generator unit 2. Both a stator jacket 211 of the generator unit 2 and the ring gear 124 of the second planetary gear stage 12 are mounted on the housing intermediate flange 151. In addition, the housing intermediate flange 151 has a bearing seating for a generator-side planet carrier bearing 126 of the second planetary gear stage 12.

The bearings 115, 116, 125, 126 of the planet carriers 112, 122 are roller bearings. Alternatively, however, they can also be slide bearings. The bearings 117, 127 of the planet gears 113, 123 mounted in the planet carriers 112, 122 are slide bearings. The bearings 234, 237 of the rotor hollow shaft 23 are slide bearings. The bearing arrangement 231 is a slide bearing.

Figure 4:
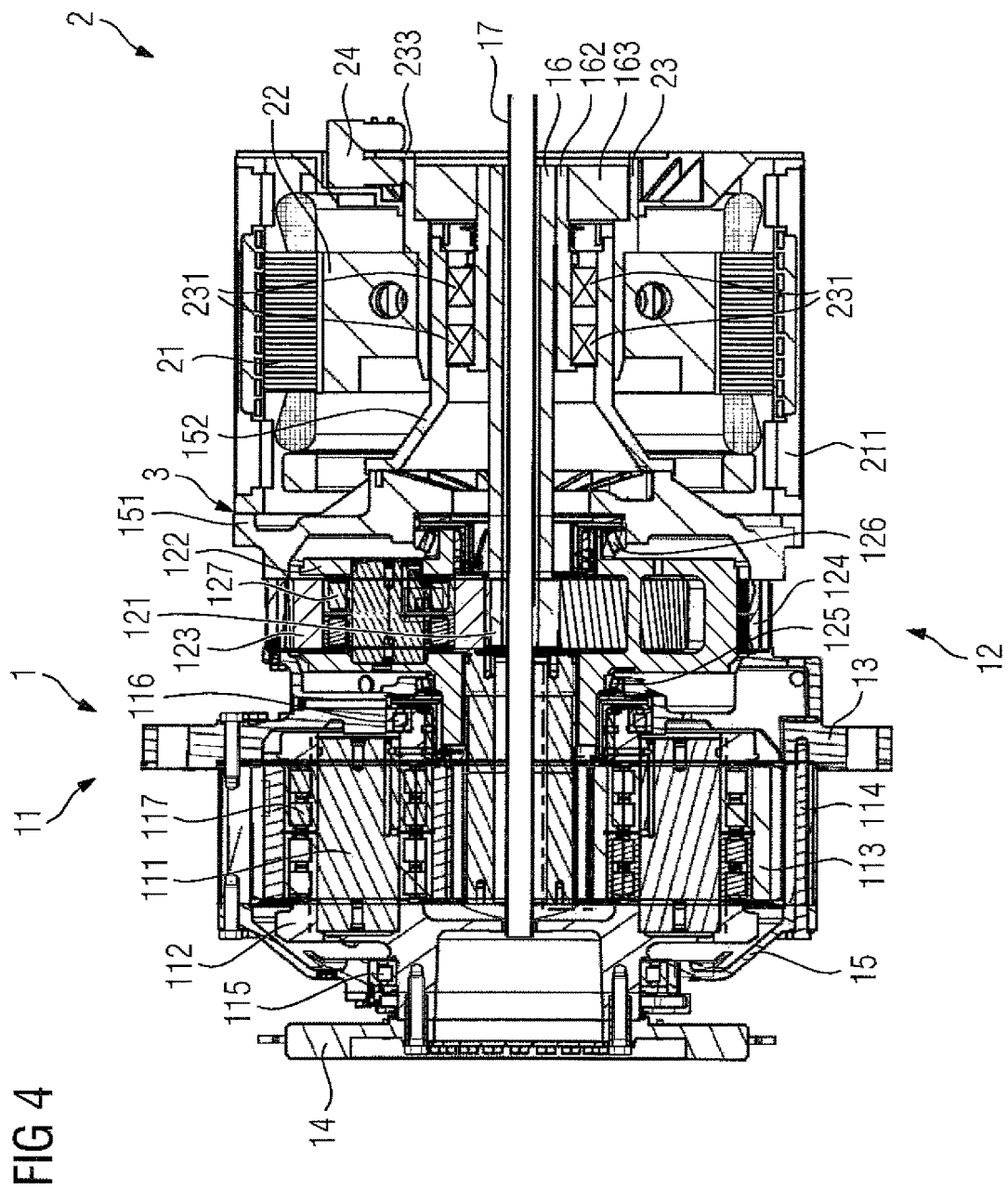
FIG. 4 is a drivetrain according to the invention with a centrally mounted rotor shaft of the generator unit.

FIG. 4 shows a drive system for a wind turbine which has a transmission unit 1 with a first 11 and a second planetary gear stage 12 in a coaxial construction. Herein, each planetary gear stage 11, 12 comprises a ring gear 114, 124, a plurality of planet gears 113, 123, a planet carrier 112, 122 and a sun gear 111, 121. The transmission unit 1 is connected via an output shaft 16 of the transmission unit 1 to a generator unit 2 and is arranged together therewith in a transmission housing 15. Between the transmission unit 1 and the generator unit 2, the transmission housing 15 has a parting line 3 along which the transmission unit 1 and the generator unit 2 can be parted.

An input shaft formed on the planet carrier 112 of the first planetary gear stage 11 is, associated with the transmission unit 1, said input shaft having a coupling flange 14 which is connectable to a wind rotor shaft, and being mounted by means of the planet carrier 112 of the first planetary gear stage 11. Two bearings 115 and 116 which represent a first and second main bearing of the transmission unit and are arranged between the planet carrier cheeks and the transmission housing 15 are associated with the planet carrier 112 of the first planetary gear stage 11. Similarly, the planet carrier 122 of the second planetary gear stage 12 is mounted by means of two bearings 125 and 126 arranged between the planet carrier cheeks and the transmission housing 15.

The generator unit 2 comprises a stator 21 and a rotor 22 which is connected non-rotatably to a rotor hollow shaft 23. Arranged radially between the output shaft 16 of the transmission unit 1 and the rotor hollow shaft 23 is a coupling, plug-in toothing or clamping connection 163. Furthermore, a transmission housing connecting piece 152 with a hollow cylindrical extension is arranged between the transmission unit 1 and the generator unit 2. The hollow cylindrical extension concentrically surrounds a generator-side end portion of the output shaft 16 and forms a bearing seating for a bearing arrangement 231 arranged radially between the output shaft 16 and the hollow cylindrical extension. It is herein immaterial whether the bearing seating 231 lies inside or outside the hollow cylindrical extension. The hollow cylindrical extension is itself surrounded concentrically by the rotor 22 and the rotor hollow shaft 23. In the present exemplary embodiment, two external bearing elements of the bearing arrangement 231 are connected to the hollow cylindrical extension.

A generator-side end portion of the output shaft 16 of the transmission unit 1 is surrounded concentrically by a transmission hollow shaft 162 and is connected non-rotatably thereto. Two internal bearing elements of the bearing arrangement 231 are connected to this transmission hollow shaft 162. Thus, both the output shaft 16 of the transmission unit 1 and also the rotor hollow shaft 23 are mounted by means of the bearing arrangement 231. In this way, in the present exemplary embodiment, the bearing arrangement 231 arranged in the hollow cylindrical extension of the transmission housing connecting piece 152 is oriented axially centrally on the rotor 22 of the generator unit 2. Furthermore, arranged within the output shaft 16 and the rotor hollow shaft 23 is a pitch tube 17 which extends axially beyond the whole of the drive system.

Furthermore, an embodiment is possible wherein the radial construction is as follows from inside to outside: output shaft 16, transmission housing connecting piece 152, bearing arrangement 231, rotor hollow shaft 23, i.e. the bearings 231 are seated radially outside on the cylindrical extension of the transmission housing connecting piece 152.

According to FIG. 4, the output shaft 16 of the transmission unit 1 is axially substantially half surrounded by the generator hollow shaft 162. The bearing arrangement 231 of the output shaft 16 within the hollow cylindrical extension of the housing connecting piece 152 preferably comprises a slide bearing which absorbs the forces in both axial directions and in the radial direction. Furthermore, the rotor hollow shaft 23 and the output shaft 16 of the transmission unit 1 are mounted, according to a particularly preferred embodiment, exclusively by means of the bearing arrangement 231 on the housing connecting piece 152. Therefore, a rear rotor hollow shaft bearing on the rotor hollow shaft 23 on an end side of the generator unit 2 facing away from the transmission unit 1 can be dispensed with.

Mounted non-rotatably fixed on the rotor hollow shaft 23 in the present exemplary embodiment on the end side of the generator unit 2 facing away from the transmission unit 1 is a brake disk 233. The brake disk 233 is thus readily accessible for maintenance purposes. A brake caliper 24 associated with the brake disk 233 is fastened on the housing cover facing away from the transmission unit 1.

The transmission hollow shaft 162 can be connected to the output shaft 16 of the transmission unit 1 by means of a toothed coupling with a short toothed coupling or spiral toothing. Alternatively thereto, the transmission hollow shaft 162 can also be connected to the output shaft 16 of the transmission unit 1 by means of an internal clamping set or a flange. The internal clamping set herein comprises at least an external ring and an internal ring which have conical contact surfaces corresponding to one another and, by means of a plurality of axially extending clamping screws, can be clamped against one another. By clamping the at least one external ring and the at least one internal ring, according to a preferred embodiment, both the output shaft 16 of the transmission unit 1 and the transmission hollow shaft 162 as well as the transmission hollow shaft 162 and the rotor hollow shaft 23 can be connected to one another, for example, frictionally. The transmission hollow shaft 162 can, for example, be expanded by clamping the external and internal rings. This then leads to a frictional connection between the transmission hollow shaft 162 and the rotor hollow shaft 23. The rotor hollow shaft 23 can, for example, also be connected to the transmission hollow shaft 162 by means of a keyed connection which is oriented axially on the internal clamping set.

Alternatively to a toothed coupling or to an internal clamping set, the transmission hollow shaft 162 can also be connected to the output shaft 16 of the transmission unit 1 by means of an external clamping set. Advantageously, on use of an external clamping set, a flange is provided on the generator-side end portion of the output shaft 16 of the transmission unit 1. Via the external clamping set, the rotor shaft 23 can also be connected to the transmission hollow shaft 162 or the output shaft 16.

In the present exemplary embodiment, the hollow cylindrical extension of the housing connecting piece 152 concentrically surrounding the bearing arrangement 231 of the output shaft 16 is formed onto a housing intermediate flange 151 arranged between the transmission unit 1 and the generator unit 2. Alternatively, the bearing arrangement 231 can surround the hollow cylindrical extension of the housing connecting piece 152. Both a stator jacket 211 of the generator unit 2 and the ring gear 124 of the second planetary gear stage 12 are mounted on the housing intermediate flange 151. In addition, the housing intermediate flange 151 has a bearing seating for a generator-side planet carrier bearing 126 of the second planetary gear stage 12.

The bearings 115, 116, 125, 126 of the planet carriers 112, 122 are roller bearings. Alternatively, however, they can also be slide bearings. The bearings 117, 127 of the planet gears 113, 123 mounted in the planet carriers 112, 122 are slide bearings. The bearing arrangement 231 for mounting the rotor hollow shaft 23 is a slide bearing.

The invention claimed is:

1. A drive system for a wind turbine, comprising:
a gearing transmission connectable to a wind rotor shaft;
a generator connected downstream of the gearing transmission; and
a slide bearing assembly configured to support the gearing transmission and the generator.

2. The drive system of claim 1, wherein the gearing transmission includes at least one planetary gear set.

3. The drive system of claim 1, wherein the slide bearing assembly includes first slide bearings for support of the generator and second slide bearing for support of the gearing transmission, said first slide bearings being separate and independent from the second slide bearings.

4. The drive system of claim 1, constructed in the form of an integrated system comprised of the transmission and the generator, said slide bearing assembly including a slide bearing configured to support the gearing transmission and to partially support the generator.

5. The drive system of claim 1, constructed in the form of a medium-speed system, said gearing transmission having two transmission stages.

6. The drive system of claim 5, wherein the gearing transmission includes two planetary gear set stages.

7. The drive system of claim 2, wherein the at least one planetary gear set includes planet gears, said slide bearing assembly including slide bearings to support the planet gears.

8. The drive system of claim 2, wherein the at least one planetary gear set includes a planet carrier, said slide bearing assembly including slide bearings to support the planet carrier.

9. The drive system of claim 1, wherein the slide bearing assembly includes a slide bearing configured as a double-direction axial slide bearing.

10. The drive system of claim 1, wherein the slide bearing assembly includes a slide bearing configured with and without segmentation.

11. The drive system of claim 1, wherein the slide bearing assembly includes a slide bearing configured with adjustable axial and radial plays.

12. The drive system of claim 1, wherein the gearing transmission and the generator are disposed such that a parting line is formed there between to enable axial separation of the gearing transmission from the generator.

* * * * *